(12) United States Patent
Fannon et al.

(10) Patent No.: US 7,225,702 B2
(45) Date of Patent: Jun. 5, 2007

(54) CABLE END FITTING RETAINER ASSEMBLY

(75) Inventors: Joseph Patrick Fannon, Washington, MI (US); Terrence P. Costigan, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/674,210

(22) Filed: Sep. 29, 2003

(65) Prior Publication Data

US 2005/0067539 A1 Mar. 31, 2005

(51) Int. Cl.
*F16C 1/10* (2006.01)

(52) U.S. Cl. .................. 74/502.4; 74/502.6; 248/64

(58) Field of Classification Search .............. 248/56, 248/64, 27.1; 74/502.4, 502.6, 502, 501.5 R, 74/502.5; 174/650, 660, 661; 292/125, 292/171, 97.22, DIG. 25; 403/353; 188/196 B; 192/111 A
See application file for complete search history.

(56) References Cited

U.S. PATENT DOCUMENTS

| | | | | | |
|---|---|---|---|---|---|
| 4,763,541 | A | * | 8/1988 | Spease | ............ 74/500.5 |
| 4,838,110 | A | * | 6/1989 | Koukal et al. | ............ 74/502.6 |
| 4,854,185 | A | * | 8/1989 | Lichtenberg et al. | .. 74/501.5 R |
| 4,917,418 | A | * | 4/1990 | Gokee | ............ 292/125 |
| 5,027,538 | A | * | 7/1991 | Wilmes et al. | ............ 40/316 |
| 5,553,818 | A | * | 9/1996 | Wild | ............ 248/56 |
| 5,590,567 | A | * | 1/1997 | Marrs et al. | ............ 74/502.4 |
| 5,615,584 | A | * | 4/1997 | Irish | ............ 74/502.6 |
| 5,953,963 | A | * | 9/1999 | Wirsing et al. | ............ 74/502.4 |
| 6,092,436 | A | * | 7/2000 | Wirsing et al. | ............ 74/502.4 |
| 6,178,845 | B1 | * | 1/2001 | Gutschner | ............ 74/502.4 |

* cited by examiner

*Primary Examiner*—Korie Chan
(74) *Attorney, Agent, or Firm*—Laura C. Hargitt

(57) ABSTRACT

A cable end fitting retainer assembly for a vehicle includes a conduit end fitting for connection to a flexible cable. The cable end fitting retainer assembly also includes an end fitting retainer arm extending from the conduit end fitting for retaining a portion of the flexible cable in a predetermined position. The cable end fitting retainer assembly further includes a cable wire support extending from the conduit end fitting and located beneath the end fitting retainer arm to contact the cable.

21 Claims, 3 Drawing Sheets

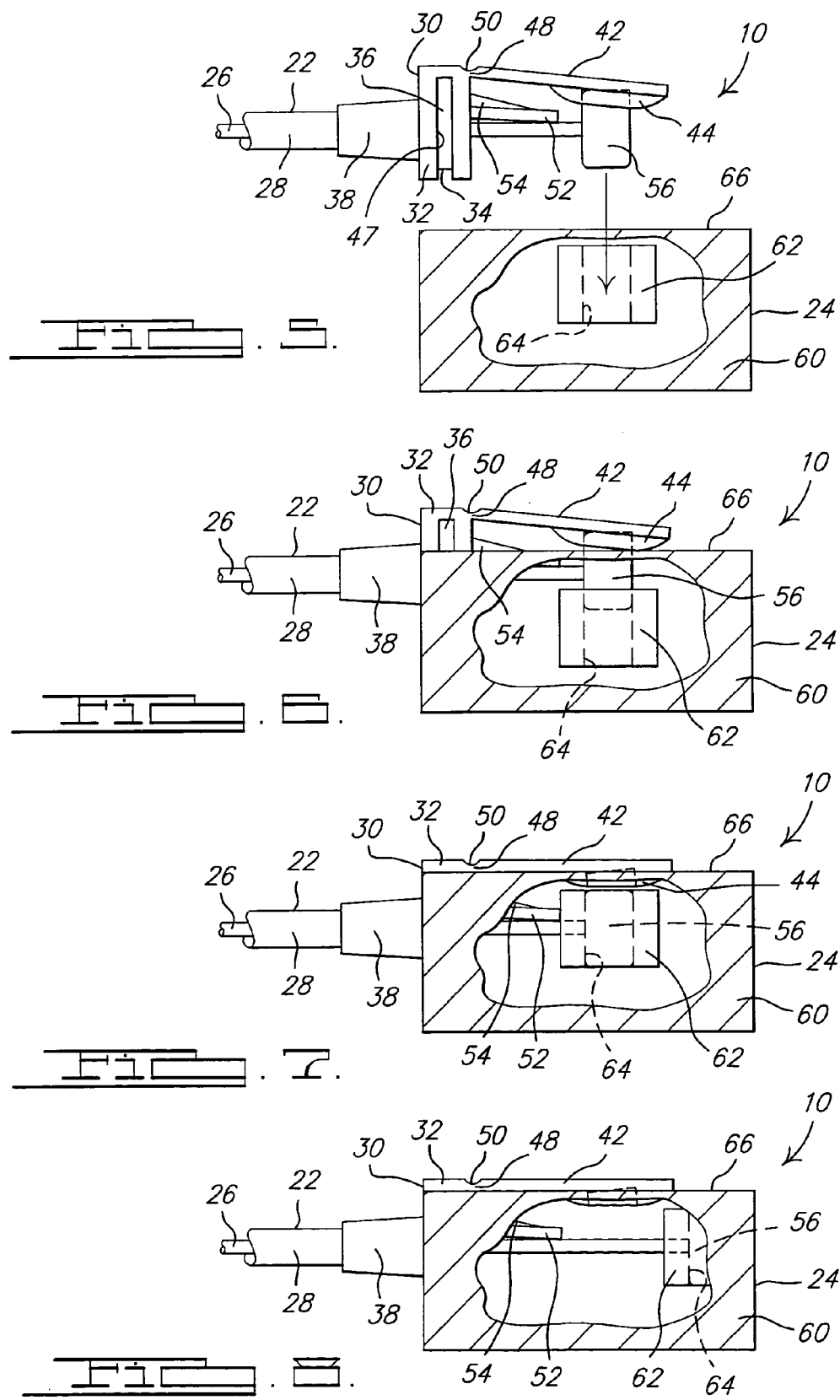

CABLE END FITTING RETAINER ASSEMBLY

TECHNICAL FIELD

The present invention relates generally to cables and, more particularly, to a cable end fitting retainer assembly for a vehicle.

BACKGROUND OF THE INVENTION

It is known that doors of a vehicle such as a motor vehicle use trim mounted cable actuated release systems. The cable actuated release system includes a cable to interconnect an interior release handle and a latch for the vehicle. Typically, the cable actuated release system has a cable end fitting that incorporates a plastic cantilevered tab with a button that serves to push an end fitting of the cable into a pawl of a release handle as an assembly aid during vehicle assembly.

The above-described cable end fitting, however, must incorporate a mechanism to prevent the cable from becoming kinked during operation. One attempt to accomplish this is to use a slip joint at the latch or handle interface. One disadvantage of using a slip joint is that the cable must be manually oriented as it is installed into the handle during vehicle assembly. With flexible cables, this is difficult, and often slows down the assembly process.

As such, the above-described cable end fitting can only be used with solid cables, and not flexible cables, which is desired. Also, this cable end fitting does nothing to retain the wire end fitting or cable ferrule in a set position, and therefore could not be used with a latch that incorporates a slip jointed cable system or a slip jointed latch-to-cable interface. Further, the cable end fitting requires manipulation of the cable while connecting it to the interior release handle for a slip joint, increasing the potential for creating kinks in the cable, which can reduce cable life. In addition, added cable length and a substantial amount of room are required to manipulate the cable. Further, this method exposes the assembler to lubricated cable strands, and introduces greater risk of kinking the cable during assembly.

As a result, it is desirable to provide a cable end fitting retainer to assemble a flexible cable to an interior release handle of a vehicle. It is also desirable to provide a cable end fitting retainer that reduces the potential for creating kinks in the cable. It is further desirable to provide a cable end fitting retainer that eliminates two-hand assembly. Therefore, there is a need in the art to provide a cable end fitting retainer assembly for a vehicle that meets these desires.

SUMMARY OF THE INVENTION

It is, therefore, one object of the present invention to provide a cable end fitting retainer assembly for a vehicle.

It is another object of the present invention to provide a cable end fitting retainer assembly for a vehicle that provides one-hand assembly of a flexible cable to an interior release handle of a vehicle.

To achieve the foregoing objects, the present invention is a cable end fitting retainer assembly for a vehicle. The cable end fitting retainer assembly includes a conduit end fitting for connection to a flexible cable. The cable end fitting retainer assembly also includes an end fitting retainer arm extending from the conduit end fitting for retaining a portion of the flexible cable in a predetermined position. The cable end fitting retainer assembly further includes a cable wire support extending from the conduit end fitting and located beneath the end fitting retainer arm to contact the cable.

One advantage of the present invention is that a cable end fitting retainer assembly is provided for a vehicle to enable a reliable one-hand quick connect capability for assembling a flexible cable to an interior release handle. Another advantage of the present invention is that the cable end fitting retainer assembly provides a quick connect and eliminates the need for assembly personnel to manipulate the cable while connecting it to the interior release handle, reducing the potential for creating kinks in the cable, thereby increasing cable life. Yet another advantage of the present invention is that the cable end fitting retainer assembly eliminates the need for assembly personnel to touch a lubricated cable, which eliminates the potential for contamination. Still another advantage of the present invention is that the cable end fitting retainer assembly provides a common cable-to-handle interface, thus insuring interchangeability of latches and interior release handles across a large number of vehicle models. A further advantage of the present invention is that the cable end fitting retainer assembly has a relatively low cost and incorporates a closeout feature to prevent air leakage. Yet a further advantage of the present invention is that the cable end fitting retainer assembly incorporates a retainer feature in a hinged arm to hold the cable end fitting stationary, as is required for a slip-jointed latch to cable interface. Still a further advantage of the present invention is that the cable end fitting retainer assembly incorporates a cable strand depressor arm for assuring that the cable is fully seated into a pawl of the interior release handle. Another advantage of the present invention is that the cable end fitting retainer assembly achieves a one-hand quick connect of the cable to the interior release handle without requiring added cable length and a substantial amount of room to manipulate the cable.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 5 is a fragmentary elevational view of the cable end fitting retainer assembly of FIG. 1 illustrating a first step of assembly.

FIG. 6 is a fragmentary elevational view of the cable end fitting retainer assembly of FIG. 1 illustrating a second step of assembly.

FIG. 7 is a fragmentary elevational view of the cable end fitting retainer assembly of FIG. 1 illustrating a third step of assembly.

FIG. 8 is a fragmentary elevational view of the cable end fitting retainer assembly of FIG. 1 illustrating a fourth step of assembly.

DESCRIPTION OF THE PREFERRED EMBODIMENT

Figure 1:
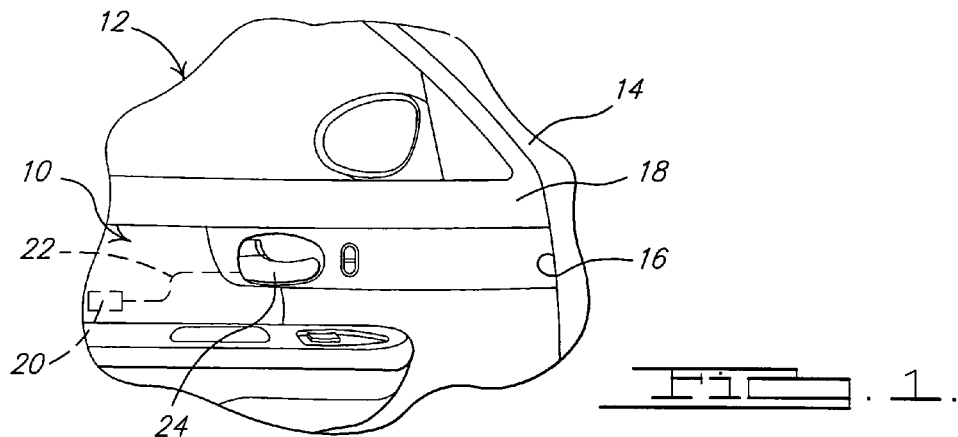
FIG. 1 is an elevational view of a cable end fitting retainer assembly, according to the present invention, illustrated in operational relationship with a vehicle.

Referring to the drawings and in particular FIG. 1, one embodiment of a cable end fitting retainer assembly 10, according to the present invention, is shown for a vehicle, partially shown and generally indicated at 12. The vehicle 12 includes a vehicle body 14 having an opening 16 and a door 18 hingedly connected at a forward end thereof to the vehicle body 14 to open and close the opening 16. The vehicle 12 also includes a latch 20 to latch and release the door 18 at a rear end thereof to the vehicle body 14. The vehicle 12 also includes a flexible cable 22 having one end connected to the latch 20 and an interior release handle 24 hingedly connected to the door 18 and to the other end of the cable 22 to release the latch 20 by an operator (not shown) of the vehicle 12. The flexible cable 22 has a flexible cable wire 26 and a cable conduit 28 surrounding the cable wire 26. The cable wire 26 is made of a flexible material such as metal. The cable conduit 28 is made of a flexible material such as plastic. The vehicle 12 includes the cable end fitting retainer assembly 10 to connect the cable 22 to the interior release handle 24. It should be appreciated that, except for the cable end fitting retainer assembly 10, the vehicle 12 is conventional and known in the art.

Figure 2:
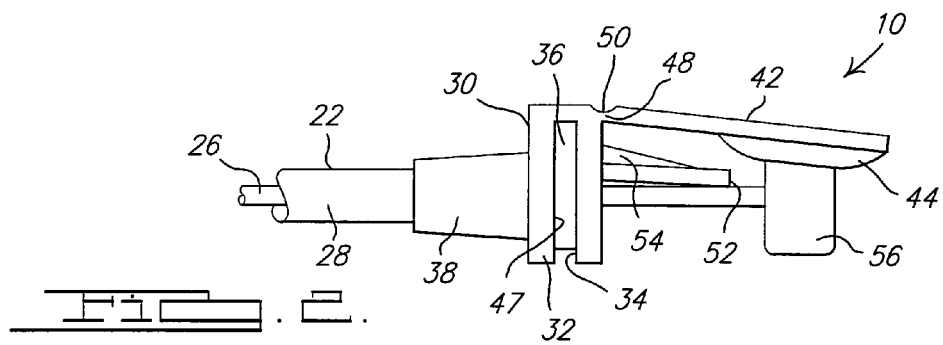
FIG. 2 is an elevational view of the cable end fitting retainer assembly of FIG. 1.
Figure 3:
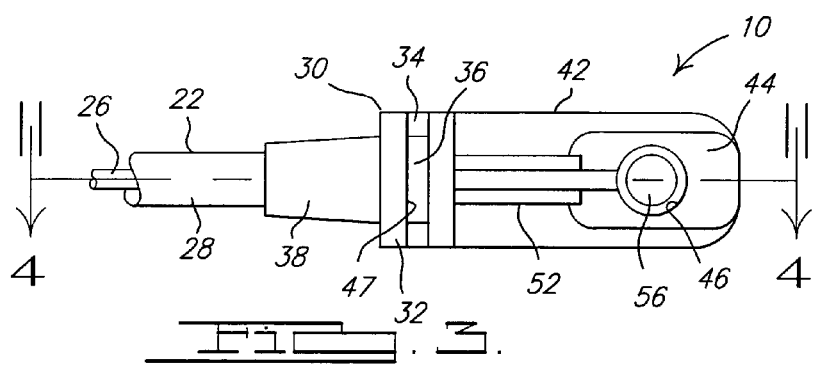
FIG. 3 is a bottom view of the cable end fitting retainer assembly of FIG. 1.
Figure 4:
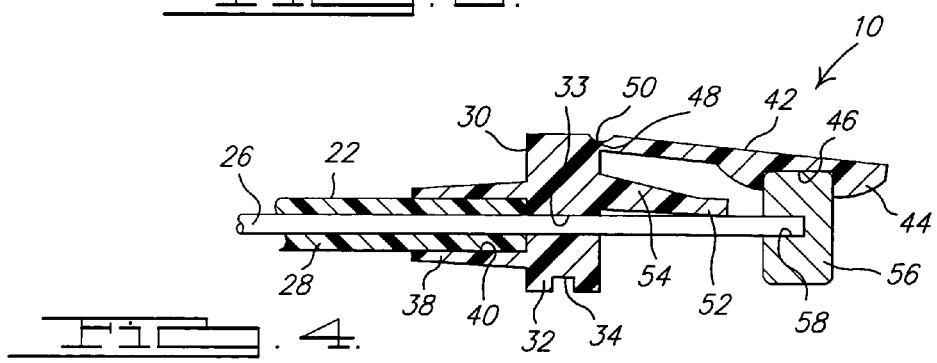
FIG. 4 is a sectional view taken along line 4—4 of FIG. 3.

Referring to FIGS. 2 through 4, the cable end fitting retainer assembly 10 includes a conduit end fitting 30 connected to the cable 22. The conduit end fitting 30 has a base portion 32 that is generally rectangular in shape. The base portion 32 has an aperture 33 extending axially therethrough. The base portion 32 has a generally U-shaped groove 34 forming an interior portion 36 having a generally rectangular shape for a function to be described.

The conduit end fitting 30 also includes a conduit portion 38 extending axially from one end of the base portion 32. The conduit portion 38 has a cavity 40 extending axially therein to receive the cable conduit 28 of the cable 22. It should be appreciated that the cable conduit 28 is press-fitted in the cavity 40 and the cable wire 26 extends through the cable conduit 28 and the aperture 33 of the base portion 32.

Referring to FIGS. 1 through 4, the cable end fitting retainer assembly 10 includes an end fitting retainer arm 42 extending axially from the base portion 32 of the conduit end fitting 30 opposite the conduit portion 38. The end fitting retainer arm 42 is generally rectangular in shape. The end fitting retainer arm 42 extends from the base portion 30 downward at a sloping angle to intersect a cable end fitting 56 to be described. The end fitting retainer arm 42 has a raised portion 44 at one end thereof. The raised portion 44 has a retainer pocket or cavity 46 extending therein to constrain the cable end fitting 56 at predetermined distance from an end fitting datum surface 47. It should be appreciated that the end fitting retainer arm 42 is cantilevered to the base portion 32. It should also be appreciated that the cavity 46 is dimensioned to restrict lateral movement of the cable end fitting 56 while permitting sufficient longitudinal movement to account for dimensional tolerance of the interfacing members as the cable end fitting 56 is inserted into the interior release handle 24.

The cable end fitting retainer assembly 10 also includes a hinge 48 interconnecting the base portion 32 and the end fitting retainer arm 42. The hinge 48 is of a living hinge type formed by a recess 50 extending inwardly. It should be appreciated that the hinge 48 allows the end fitting retainer arm 42 to rotate relative to the base portion 32. It should also be appreciated that the hinge 48 attaches and constrains the end fitting retainer arm 42 at the top of the conduit end fitting 30.

The cable end fitting retainer assembly 10 includes a cable wire support 52 extending axially from the base portion 32 and located beneath the end fitting retainer arm 42 and adjacent to the aperture 33. The cable wire support 52 extends from the base portion 32 downward at a sloping angle. The cable wire support 52 is generally rectangular in shape. The cable wire support 52 includes a strengthening rib 54 extending axially therealong to strengthen the cable wire support 52. The cable wire support 52 is a relatively rigid member. It should be appreciated that the cable wire support 52 protrudes down to contact the cable wire 26.

The conduit end fitting 30, end fitting retainer arm 42, hinge 48, and cable wire support 52 are made of a rigid material, preferably a plastic material. The conduit end fitting 30, end fitting retainer arm 42, hinge 48, and cable wire support 50 are formed as a monolithic structure being integral, unitary, and one-piece.

The cable end fitting retainer assembly 10 also includes a cable end fitting 56 attached to one end of the cable 22. The cable end fitting 56 is generally barrel shaped. The cable end fitting 56 has a cavity 58 extending axially therein to receive the end of the cable wire 26. The cable end fitting 56 is removably disposed in the cavity 46 of the end fitting retainer arm 42. The cable end fitting 56 is made of a metal material such as brass. It should be appreciated that the cable end fitting 56 and the cable wire 26 are press-fitted together to secure the cable end fitting 56 to the cable wire 26. It should also be appreciated that the cable wire 26 is conventional and known in the art.

Referring to FIGS. 5 through 8, vehicle assembly of the cable 22 to the release handle 24 is shown. Prior to vehicle assembly, the cable 22 is assembled to the cable end fitting retainer assembly 10. The conduit portion 38 is press-fitted over the cable conduit 28, the cable wire 26 extends through the aperture 33 of the conduit end fitting 30, and the cable end fitting 56 is disposed in the cavity 46 of the end fitting retainer arm 42. It should be appreciated that the cable end fitting 56 is held in a predetermined position by the cable end fitting retainer assembly 10.

During vehicle assembly, an assembly operator (not shown), using one hand, moves the cable end fitting retainer assembly 10 and cable 22 over a handle housing 60 of the interior release handle 24. The operator aligns the conduit end fitting 30 with the handle housing 60 and the cable end fitting 56 with a handle pawl 62 disposed within the handle housing 60 as illustrated in FIG. 5. It should be appreciated that the handle pawl 62 has an aperture 64 extending therethrough to receive the cable end fitting 56. It should also be appreciated that the handle housing 60 and handle pawl 62 are conventional and known in the art.

Once aligned, the operator moves the cable end fitting retainer assembly 10 and cable 22 toward the handle housing 60 and handle pawl 62 as illustrated in FIG. 6. The base portion 32 of the conduit end fitting 30 is partially disposed in a slot (not shown) in the handle housing 60 such that a portion of the handle housing 60 is received in the groove 36. In addition, the cable end fitting 56 is partially disposed in the aperture 64 of the handle pawl 62. The cable wire support 50 forces the cable wire 26 downward and the cable end fitting 56 into the handle pawl 62. It should be appreciated that the cable end fitting retainer assembly 10 and cable 22 are partially inserted into the handle housing 60 and handle pawl 62 as illustrated in FIG. 6.

The operator continues to move the cable end fitting retainer assembly 10 and cable 22 onto the handle housing 60 and handle pawl 62 as illustrated in FIG. 7. The base portion 32 of the conduit end fitting 30 is fully disposed in the slot in the handle housing 60 and the end fitting retainer arm 42 contacts an upper surface 66 of the handle housing 60. In addition, the cable end fitting 56 is fully disposed in the aperture 64 of the handle pawl 62. As the cable end fitting retainer assembly 10 is fully seated into the handle housing 60, the hinge 48 bends the end fitting retainer arm 42 upwardly and the end fitting retainer arm 42 becomes disengaged from the cable end fitting 56. It should be appreciated that the cable wire support 52 forces the cable wire 26 and cable end fitting 56 into the handle pawl 62 as the end fitting retainer arm 42 becomes disengaged from the cable end fitting 56 during end fitting insertion. It should also be appreciated that the cable wire support 52 assures that the cable end fitting 56 will not remain with the end fitting retainer arm 42 as the end fitting retainer arm 42 is bent up during insertion. It should further be appreciated that the cable end fitting retainer assembly 10 and cable 22 are fully inserted into the handle housing 60 and handle pawl 62 as illustrated in FIG. 7.

Upon actuation of the interior release handle 24, the cable wire 26 and cable end fitting 56 are free to move with the handle pawl 62 as illustrated in FIG. 8. It should be appreciated that, during vehicle assembly, the cavity 46 of the end fitting retainer arm 42 positions the cable end fitting 56 such that it can be quickly and single handedly inserted into the handle pawl 62 with a high degree of accuracy and also permit blind assembly if necessary.

Figure 9:
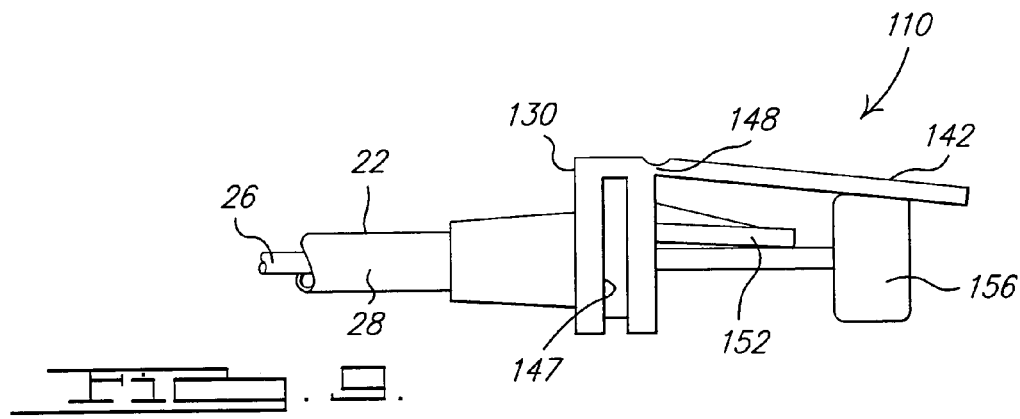
FIG. 9 is an elevational view of another embodiment, according to the present invention, of the cable end fitting retainer assembly of FIG. 1.
Figure 10:
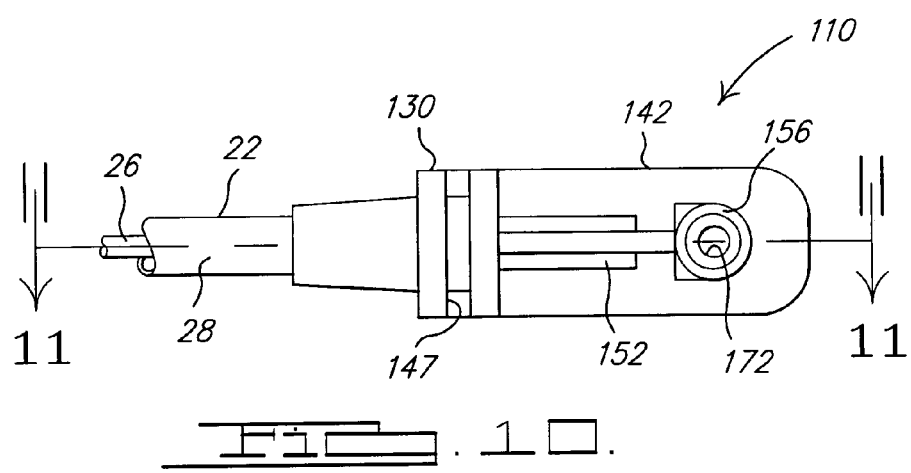
FIG. 10 is a bottom view of the cable end fitting retainer assembly of FIG. 9.
Figure 11:
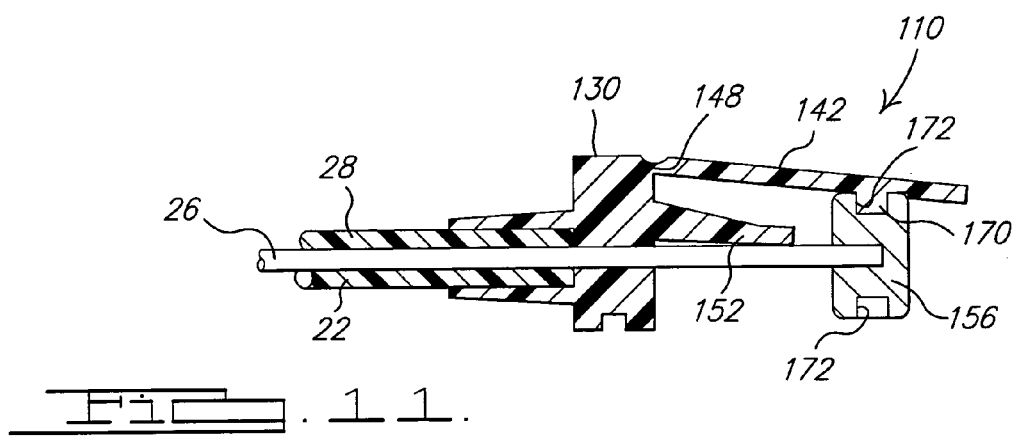
FIG. 11 is a sectional view taken along line 11—11 of FIG. 10.

Referring to FIGS. 9 through 11, another embodiment, according to the present invention, of the cable end fitting retainer assembly 10 is shown. Like parts of the cable end fitting retainer assembly 10 have like reference numerals increased by one hundred (100). In this embodiment, the cable end fitting retainer assembly 110 includes the conduit end fitting 130, end fitting retainer arm 142, hinge 148, and cable wire support 152 and eliminates the raised portion and cavity of the retainer arm. The cable end fitting retainer assembly 110 includes the end fitting retainer arm 142 having a projection or pin 170 extending downwardly therefrom. The cable end fitting retainer assembly 110 also includes the cable end fitting 156 having at least one, preferably a cavity 172 extending therein at each end with one cavity 172 to receive the pin 170. The operation and assembly of the cable end fitting retainer assembly 110 is similar to the cable end fitting retainer assembly 10. It should be appreciated that the pin 170 constrains the cable end fitting 156 at predetermined distance from the end fitting datum surface 147.

Accordingly, the cable end fitting retainer assembly 10,110 constrains and orients the cable end fitting 56,156 permitting simple and accurate one-hand assembly of the cable 22 to the interior release handle 24, thereby speeding up the vehicle assembly process. The cable end fitting retainer assembly 10,110 also holds the cable end fitting 56,156 in a predetermined position, enabling a common handle interface for all cable actuated interior handle systems, permitting interchangeability of latches and interior release handles for various vehicle models.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A cable end fitting retainer assembly for a vehicle comprising:
   a conduit end fitting for connection to a flexible cable;
   an end fitting retainer arm extending axially from said conduit end fitting for retaining a portion of the flexible cable in a predetermined position; and
   a cable wire support extending axially from said conduit end fitting a distance less than said end fitting retainer arm and spaced radially from and located beneath said end fitting retainer arm to contact the cable.

2. A cable end fitting retainer assembly as set forth in claim 1 including a hinge interconnecting said conduit end fitting and said end fitting retainer arm.

3. A cable end fitting retainer assembly as set forth in claim 2 wherein hinge is a living hinge.

4. A cable end fitting retainer assembly as set forth in claim 1 wherein said end fitting retainer arm has a raised portion.

5. A cable end fitting retainer assembly as set forth in claim 4 wherein said end fitting retainer arm has a cavity extending into said raised portion to receive an end fitting of the cable.

6. A cable end fitting retainer assembly as set forth in claim 1 wherein said conduit end fitting comprises a base portion and a conduit portion extending from said base portion.

7. A cable end fitting retainer assembly as set forth in claim 6 wherein said base portion has a groove extending therein to receive a portion of an interior release handle.

8. A cable end fitting retainer assembly as set forth in claim 6 wherein said conduit portion has a cavity extending therein to receive a cable conduit of the cable.

9. A cable end fitting retainer assembly as set forth in claim 6 wherein said cable wire support extends axially from said base portion.

10. A cable end fitting retainer assembly as set forth in claim 1 wherein said cable wire support includes a strengthening rib extending therealong to strengthen said cable wire support.

11. A cable end fitting retainer assembly as set forth in claim 1 wherein said end fitting retainer arm has a projection extending therefrom to be received in a cavity of an end fitting of the cable.

12. A cable end fitting retainer assembly comprising:
    a conduit end fitting for connection to a flexible cable;
    a cable end fitting connected to the cable for connection to an interior release handle;
    an end fitting retainer arm extending axially from said conduit end fitting for retaining said cable end fitting in a predetermined position; and
    a cable wire support extending axially from said conduit end fitting a distance less than said end fitting retainer arm and spaced radially from and located beneath said end fitting retainer arm to contact the cable.

13. A cable end fitting retainer assembly as set forth in claim 12 including a hinge interconnecting said conduit end fitting and said end fitting retainer arm.

14. A cable end fitting retainer assembly as set forth in claim 13 wherein said hinge is a living hinge.

15. A cable end fitting retainer assembly as set forth in claim 1 wherein said end fitting retainer arm has a cavity extending therein to receive said cable end fitting.

16. A cable end fitting retainer assembly as set forth in claim 12 wherein said conduit end fitting comprises a base portion and a conduit portion extending from said base portion.

17. A cable end fitting retainer assembly as set forth in claim 16 wherein said base portion has a groove extending therein to receive a portion of an interior release handle.

18. A cable end fitting retainer assembly as set forth in claim 16 wherein said conduit portion has a cavity extending therein to receive a cable conduit of the cable.

19. A cable end fitting retainer assembly as set forth in claim 12 wherein said cable wire support includes a strengthening rib extending therealong to strengthen said cable wire support.

20. A cable end fining retainer assembly as set forth in claim 12 wherein said end fitting retainer arm has a projection extending therefrom to be received in a cavity of said cable end fitting.

21. An assembly for a vehicle comprising:

a release handle;

a latch;

a flexible cable interconnecting said release handle and said latch; and a cable end fitting retainer assembly connected to said cable and said release handle comprising a conduit end fitting connected to said cable, an end fitting retainer arm extending axially from said conduit end fitting for retaining a portion of said cable in a predetermined position, and a cable wire support extending axially from said conduit end fitting a distance less than said end fitting retainer arm and spaced radially from and located beneath said end fitting retainer arm to contact said cable.

* * * * *